April 12, 1927.
P. S. O'NEILL
BREAKING-DOWN SAW
Filed Aug. 28, 1926
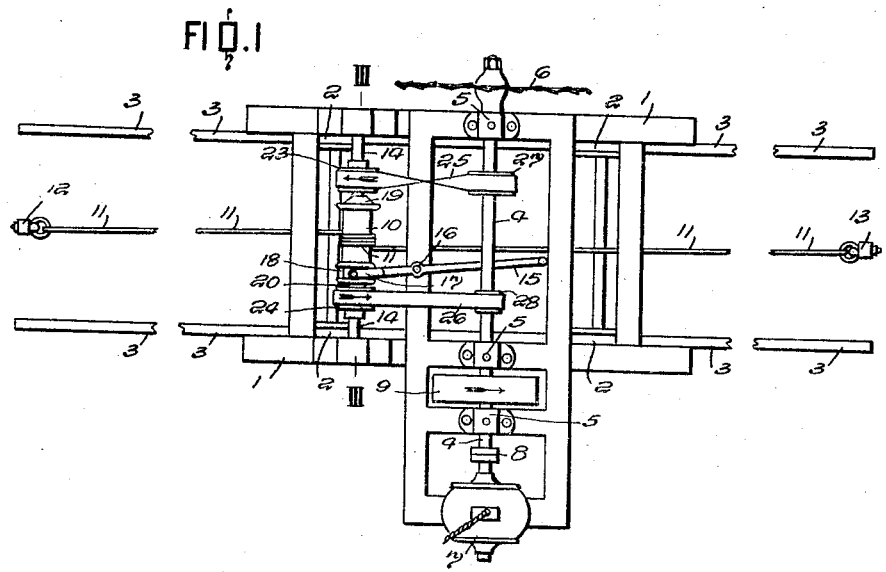
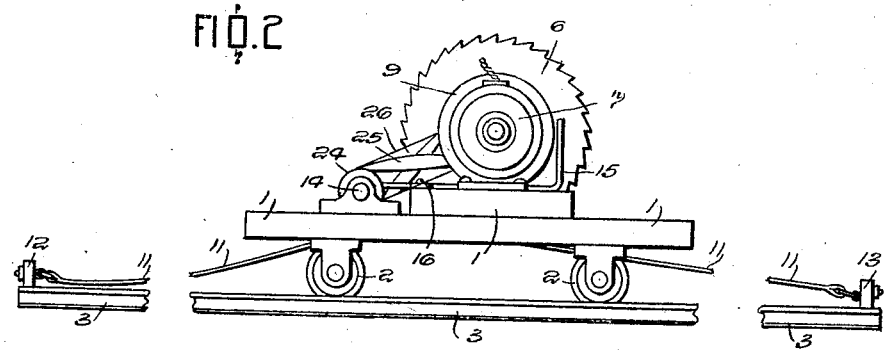
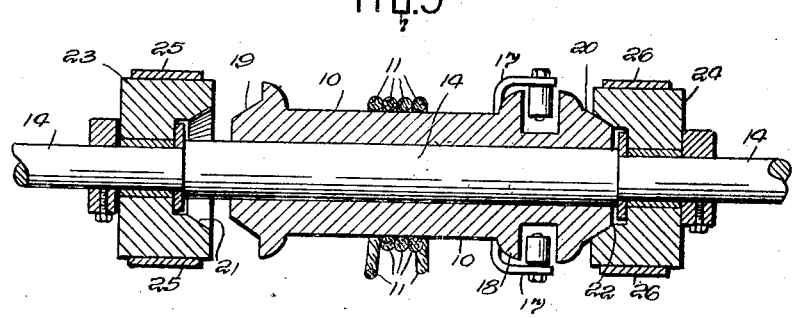
Patrick Sarsfield O'Neill.

Patented Apr. 12, 1927.

1,624,064

UNITED STATES PATENT OFFICE.

PATRICK SARSFIELD O'NEILL, OF AICKEN'S TOWNSHIP, WESTLAND, NEW ZEALAND.

BREAKING-DOWN SAW.

Application filed August 28, 1926, Serial No. 132,271, and in New Zealand September 3, 1925.

This invention relates to circular saws of the type employed in breaking-down logs.

In constructions hitherto employed for this purpose the saw-spindle, which has usually been belt-driven from an engine or other source of power, has been carried in bearings upon stationarily mounted saw bench, while the log has been supported upon a truck or travelling platform by means of which such log has been caused to travel back and forth past the saw as required.

A construction of this kind is however necessarily heavy and massive, more particularly the truck or travelling platform which is required to withstand the strain and shock occasioned by heavy logs being rolled into place thereon.

It is the object of the present invention however to provide a novel construction for this purpose capable of being operated with a minimum of labour, such construction being light, powerful and capable of being simply and easily transported from place-to-place and quickly erected, while the cost will be considerably less than in the case of constructions hitherto employed.

In carrying this object into effect the invention consists briefly of a bench adapted for movement back and forth along a railed track, such bench carrying the saw together with the necesssary source of power and means for actuating such bench in its said travel, while the long to be operated upon will be arranged stationary at one side of the said track and disposed longitudinally thereof.

In order that the nature of the invention and its construction may be clearly understood, it will now be fully described and explained with reference to the accompanying sheet of drawings, in which:—

Fig. 1 is a plan-view of the bench and its track,

Fig. 2 is a side elevation of the same, and,

Fig. 3 is a sectional view along the line III—III Fig. 1 illustrating, upon a somewhat larger scale, the arrangement of the winding-drum employed in actuating the movements of the said bench and the means for driving such drum in either direction.

As here shown 1 is a bench consisting of a suitable horizontal framework supported upon carrying wheels 2 by means of which such bench is adapted to travel back and forth along a suitable rail-track 3.

Disposed transversely of the said bench 1 is a horizontal spindle 4 rotatably mounted in bearings 5 upon such bench and upon one end of which spindle, overhanging one of the lateral sides of the bench, is fixed a circular saw 6.

Upon the said bench is carried also a suitable source of power for rotating the spindle 6, such source of power consisting preferably of an electric motor 7 direct coupled as at 8 or otherwise operatively connected with the saw-spindle 4, as by means of a friction-clutch or other appropriate gearing.

The saw-spindle 4 is preferably provided also with a suitable fly-wheel 9 adapted by its inertia to assist the motor 7 or other source of power in maintaining a uniform speed of rotation of the spindle under the varying conditions of load to which the spindle is subject when operating upon logs.

For the purpose of actuating the bench in its said travel back and forth along the track 3 there is provided a drum 10 having its axis disposed horizontally and transversely with the said bench in which such drum is rotatably mounted.

The said drum is rotatable in either direction by power supplied from the said source as 7 and is adapted when so rotated to wind and un-wind upon its periphery a rope, chain, or other flexible connection 11 extending longitudinally with the said track and anchored at fixed points as 12 and 13 located one near either end of such track.

In the preferred form of the construction as here shown the said drum 10 is supported upon a fixed axle 14 and upon which such drum is adapted to perform both axial rotation and longitudinal sliding movement, which latter is controlled manually as by means of a hand-lever as 15 fulcrumed as at 16 to a fixed point upon the bench and provided at one end with a fork or other formation 17 to be engageable with a peripheral groove 18 formed in the said drum near one end thereof.

The two ends of the said drum are formed each with one member of a friction-clutch, such clutch-members being designated 19 and 20 respectively, while mounted upon the portions of the axle 14 one at either end of the said drum are a corresponding pair of clutch-members 21 and 22.

The said clutch-members 21 and 22 are so mounted as to be capable of axial rotation but are restrained from longitudinal movement upon the axle and such clutch-members are operatively connected with the said source of power 7 in such a manner as to cause them to be rotated thereby in opposite directions.

In the preferred form of the invention this is effected by gearing the members 21 and 22 to the saw-spindle 4, such gearing being of any suitable or appropriate form such for instance as pulleys 23 and 24 upon the clutch-members 21 and 22 connected by belts 25 and 26 with pulleys 27 and 28 fixed upon the saw-spindle.

The arrangement is such that if the said drum occupies a position mid-way between the clutch-members 21 and 22 such drum will be free to remain at rest, but if such drum is slid longitudinally with the axle into one or other of its extreme positions so as to cause the member 19 to engage the member 21, or the member 20 to engage the member 22, such drum will thereby be connected with the power and so caused to rotate.

In operation, the bench being in the desired position to commence the cut, that is to say at the extreme end of its travel towards the anchor 12, the log to be sawn will be placed to extend longitudinally with the track at the side thereof at which the saw is located. The lever 15 will then be turned manually so as to slide the drum into its extreme position in which its clutch-member 20 engages with the clutch-member 22 thereby causing such drum to rotate in the required direction to feed or travel the bench toward the other end of the track, namely that at which the anchor 13 is located and during which movement a flitch will be cut from the log by the saw. On completion of the cut the lever 15 will be moved manually to slide the drum to its other extreme position in which its clutch-member 19 engages the clutch-member 21 thereby causing such drum to be rotated in the other or opposite direction in which it produces the back-feed or travel of the bench back to its said position to commence the next cut.

In this manner the bench may be operated simply and quickly by one man with the assistance of a second man to move the log towards the saw at the commencement of each cut and to remove the flitch when severed.

I claim:—

1. Improvements relating to breaking down saws comprising a wheeled bench arranged to travel back and forth upon a railed track, a spindle disposed transversely upon said bench and rotatable in bearings thereon, a circular saw fixed upon one end of said spindle to overhang one lateral side of said bench, a source of power carried upon said bench and connected to rotate said spindle, a flexible connection disposed longitudinally with said track and anchored to fixed points located one near either end thereof, a drum rotatably mounted in said bench and adapted when rotated to wind and unwind said connection thereby to produce the travel of said bench, a pair of friction-clutch-members mounted upon said bench and connected with said source of power to be rotated thereby in opposite directions, and manual means whereby said drum may be brought into engagement alternatively with each of said friction-clutch-members thereby to produce its rotation in either direction.

2. Improvements relating to breaking down saws comprising the combination with a wheeled bench travellable back and forth upon a rail track, a saw, a spindle and a source of power therefor mounted upon said bench, of fixed axle mounted upon said bench to extend transversely thereof, a drum mounted upon said axle to be rotatable axially and slidable longitudinally thereon, one member of a friction clutch formed upon each end of said drum, a corresponding pair of friction-clutch members located one at either end of said drum and mounted upon said axle to be rotatable axially but incapable of longitudinal movement thereon, means connecting last said clutch members with said source of power thereby to rotate them in opposite directions, manually operable means for controlling said sliding movement of the drum to bring its said clutch-members into and out of engagement with their said corresponding clutch-members thereby to cause said drum to be rotated in either direction, and a flexible connection disposed longitudinally with said track and having its ends anchored to fixed points located one near either end of said track while the intermediate portion is adapted to wind and unwind upon said drum thereby causing the rotation of the latter to effect the said travel of said bench along the track.

3. Improvements relating to breaking down saws as defined in claim 2, characterized in that the said friction clutch members are connected by gearing with the said saw-spindle thereby to effect their said rotation in opposite directions.

In testimony whereof I have hereunto signed my name at Greymouth, in the Dominion of New Zealand, the twenty-fourth day of July, 1926.

PATRICK SARSFIELD O'NEILL.